US 8,508,596 B2

United States Patent
Hsieh

(10) Patent No.: US 8,508,596 B2
(45) Date of Patent: Aug. 13, 2013

(54) SENSOR SYSTEM DETECTION DEVICE AND DETECTION METHOD USING SAME

(75) Inventor: Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 232 days.

(21) Appl. No.: 12/961,903

(22) Filed: Dec. 7, 2010

(65) Prior Publication Data

US 2012/0033086 A1     Feb. 9, 2012

(30) Foreign Application Priority Data

Aug. 6, 2010   (TW) ................................ 99126202 A

(51) Int. Cl.
    *H04N 17/00*     (2006.01)
    *H04N 9/43*     (2006.01)
    *H04N 5/225*     (2006.01)
    *H04N 9/73*     (2006.01)

(52) U.S. Cl.
USPC ........... 348/187; 348/32; 348/224.1; 348/342

(58) Field of Classification Search
USPC ............... 348/32–34, 151, 216.1, 187, 222.1, 348/226.1, 227.1, 376, 14.02, 14.12, 360, 348/333.01, 164, 224.1, 229.1, 342
See application file for complete search history.

(56) References Cited

U.S. PATENT DOCUMENTS

| | | | | |
|---|---|---|---|---|
| 5,194,943 | A * | 3/1993 | Tomita et al. | 348/255 |
| 5,713,055 | A * | 1/1998 | Lawther et al. | 396/165 |
| 7,319,489 | B2 * | 1/2008 | Miki | 348/371 |
| 2003/0030740 | A1 * | 2/2003 | Tsujino | 348/333.01 |
| 2004/0049692 | A1 * | 3/2004 | Okamoto | 713/193 |
| 2005/0088537 | A1 * | 4/2005 | Nakamura et al. | 348/223.1 |
| 2007/0263092 | A1 * | 11/2007 | Fedorovskaya et al. | 348/207.1 |
| 2009/0135295 | A1 * | 5/2009 | Kunishige et al. | 348/362 |
| 2009/0147112 | A1 * | 6/2009 | Baldwin | 348/273 |
| 2011/0018971 | A1 * | 1/2011 | Hasegawa | 348/47 |
| 2011/0122252 | A1 * | 5/2011 | Choi et al. | 348/164 |

* cited by examiner

*Primary Examiner* — Victor Kostak
(74) *Attorney, Agent, or Firm* — Altis Law Group, Inc.

(57) ABSTRACT

A sensor system detection device for detecting quality of a sensor system includes a first connector electrically connected to the sensor system, a second connector; a display unit, a controller and an encoder. A first terminal of the encoder is connected to the first connector to receive first image data from the sensor system. A second terminal of the encoder is connected to the display unit via the second connector. A third terminal of the encoder is connected to the controller. The controller controls the encoder to transform the first image into second image data matching with the display unit. The second image data is transferred to the display unit.

9 Claims, 2 Drawing Sheets

SENSOR SYSTEM DETECTION DEVICE AND DETECTION METHOD USING SAME

BACKGROUND

1. Technical Field

The present disclosure relates to detecting technologies, and particularly, to a sensor system detection device and a detection method using the same.

2. Description of Related Art

An image capturing device, such as a digital camera or a web camera, includes a main board and a sensor system. The sensor system includes a substrate, an image sensor positioned on the substrate, and an infrared cut filter for filtering infrared radiation. During manufacturing, the quality of the sensor system is detected by observing images captured by the sensor system and shown on a display device. However, the sensor system outputs YUV format image data, while the display device can only receive National Television System Committee (NTSC) format image data or Phase Alternate Line (PAL) format image data. Therefore, the sensor system needs to be assembled with the main board to form a semifinished product of the image capturing device, because the semifinished product of the image capturing device outputs NTSC format image data or PAL format image data matching with the display device. If the sensor system is not qualified, the sensor system needs to be disassembled from the main board. This decreases the detection efficiency of the sensor system.

Therefore, it is desirable to provide a sensor system detection device and a detection method using the same, which can overcome or at least alleviate the above-mentioned problems.

DETAILED DESCRIPTION

Figure 1:
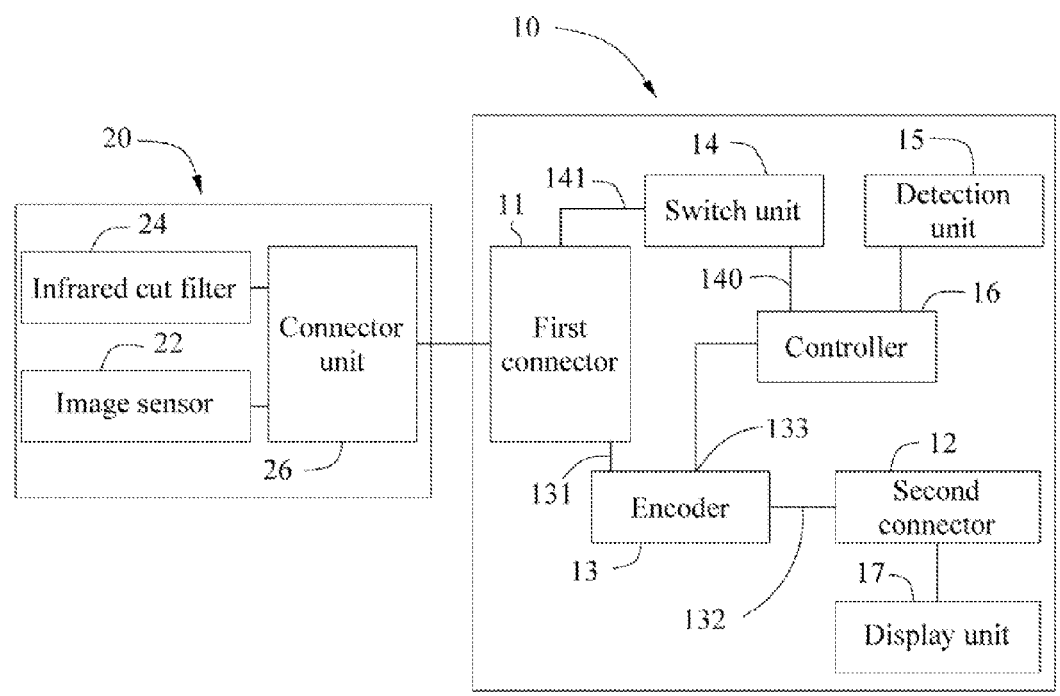
FIG. 1 is a functional block diagram of a sensor system detection device for detecting a sensor system, according to a first exemplary embodiment.

FIG. 1 is a functional block diagram of a sensor system detection device 10 for detecting a sensor system 20, according to a first exemplary embodiment. The sensor system detection device 10 includes a first connector 11, a second connector 12, an encoder 13, a switch unit 14, a detection unit 15, a controller 16, and a display unit 17. In this embodiment, the sensor system 20 can be, for example, a camera module used in a mobile phone, a digital camera or a personal digital assistant.

The sensor system 20 includes a substrate (not shown), an image sensor 22, an infrared cut filter 24, and a connector unit 26. The image sensor 22 is positioned on the substrate and configured for capturing an image to output first image data having a YUV format. The infrared cut filter 24 is positioned above the image sensor 22 and configured for filtering infrared radiation. The connector unit 26 is electrically connected to the image sensor 22 and the infrared cut filter 24 and connected to the sensor system detection device 10.

The encoder 13 may be a transducer or a software program which converts information from one format or code to another, for the purposes of standardization, speed, secrecy, security, or saving space by shrinking size. A first terminal 131 of the encoder 13 is connected to the sensor system 20 via the first connector 11. A second terminal 132 of the encoder 13 is connected to the display unit 17 via the second connector 12. A third terminal 133 of the encoder 13 is connected to the controller 16. The controller 16 controls the encoder 13 to transform the first image data into second image data having an NTSC format or a PAL format. That is, the encoder 13 receives the first image data and outputs the second image data. The display unit 17 receives the second image data.

A first terminal 141 of the switch unit 14 is connected to the sensor system 20 via the first connector 11. A second terminal 142 of the switch unit 14 is connected to the detection unit 15 via the controller 16. The detection unit 15 is configured for detecting the environmental brightness. If the environmental brightness is equal to or less than a predetermined brightness, the controller 16 controls the switch unit 14 to open the infrared cut filter 24. If the environmental brightness is greater than the predetermined brightness, the controller 16 controls the switch unit 14 to close the infrared cut filter 24. In this embodiment, 'open the infrared cut filter 24' means that the switch unit 14 moves the infrared cut filter 24 in a light path of light incident on the image sensor 22 and the infrared cut filter 24 works and filters infrared radiation. As well, 'close the infrared cut filter 24' means that the switch unit 14 moves the infrared cut filter 24 out of the light path of the light incident on the image sensor 22 and the infrared cut filter 24 does not filter infrared radiation. For example, the infrared cut filter 24 is opened and works at night or in a low light condition, such as in a condition, where there is no lamp irradiation at night. The infrared cut filter 24 is closed and does not work in the daytime or in a high light condition, such as in a condition where there is lamp irradiation at night. Thus, color offset of the image captured by the image sensor 22 is avoided. In this embodiment, the detection unit 15 is a light dependent resistor or a photosensitive sensor having characters of the light dependent resistor.

Figure 2:
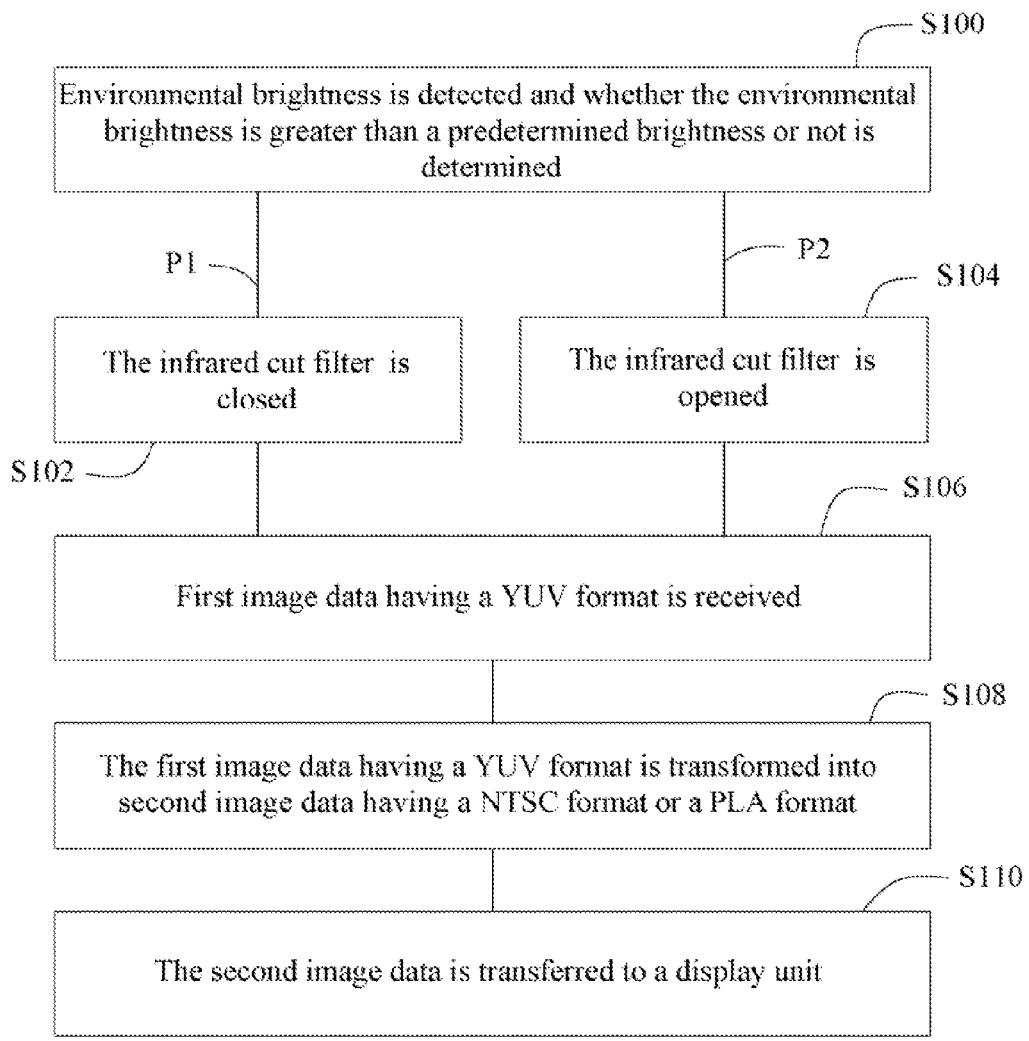
FIG. 2 is a flowchart of a detection method for a sensor system, according to a second exemplary embodiment.

FIG. 2 is a flowchart of a detection method for a sensor system 20, according to a second exemplary embodiment. The detection method can be implemented by, for example, the sensor system detection device 10 and includes the following steps.

In step S100, environmental brightness is detected and whether the environmental brightness is greater than a predetermined brightness or not is determined. If the environmental brightness is greater than a predetermined brightness, the detection method follows path P1 to step S102, in which the infrared cut filter 24 is closed. If the environmental brightness is less than or equal to the predetermined brightness, the detection method follows path P2 to step S104, in which the infrared cut filter 24 is opened. After step S102 or step S104, the method goes to step S106, in which first image data having a YUV format is received. In step S108, the first image data having a YUV format is transformed into second image data having hall an NTSC format or a PAL format. In step S110, the second image data is transferred into the display unit 17.

The method avoids assembling the sensor system 20 with a main board (not shown), because the first image data can be transformed into second image data matching with the display unit 17, thus increasing the detection efficiency of the sensor system 20.

It is to be understood, however, that even though numerous characteristics and advantages of the present embodiments have been set forth in the foregoing description, together with details of the structures and functions of the embodiments. The disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sensor system detection device for detecting quality of a sensor system which comprises an image sensor for capturing an image and outputting first image data, an infrared cut filter positioned above the image sensor, and a connector unit electrically connected to the image sensor and the infrared cut filter, the sensor system detection device comprising:
   a first connector electrically connected to the connector unit;
   a second connector;
   a display unit;
   a controller;
   a detection unit configured for detecting environmental brightness and determining whether the environmental brightness is larger than a predetermined brightness or not;
   a switch unit, a first terminal of the switch unit connected to the first connector, and a second terminal of the switch unit connected to the detection unit via the controller; and
   an encoder, a first terminal of the encoder connected to the first connector to receive the first image data from the sensor system, a second terminal of the encoder connected to the display unit via the second connector, and a third terminal of the encoder connected to the controller; wherein the controller controls the encoder to transform the first image data into second image data matching with the display unit, and controls the switch unit to selectively open the infrared cut filter if the environmental brightness is equal to or less than the predetermined brightness and close the infrared cut filter if the environmental brightness is larger than the predetermined brightness, and the second image data is transferred to the display unit.

2. The sensor system detection device as claimed in claim 1, wherein the first image data is in a YUV format.

3. The sensor system detection device as claimed in claim 1, wherein the second image data is in an NTSC format or a PAL format.

4. The sensor system detection device as claimed in claim 1, the controller controls the switch unit to open the infrared cut filter at night and close the infrared cut filter in the daytime.

5. The sensor system detection device as claimed in claim 4, wherein the detection unit is a light dependent resistor.

6. The sensor system detection device as claimed in claim 4, wherein the detection unit is a photosensitive sensor.

7. The sensor system detection device as claimed in claim 1, wherein the controller controls the switch unit to open the infrared cut filter in a low light condition and close the infrared cut filter in a high light condition.

8. A detection method for a sensor system comprising an image sensor and an infrared cut filter above the image sensor, comprising:
   detecting environmental brightness and determining whether the environmental brightness is larger than a predetermined brightness or not, the infrared cut filter controlled to be opened by a controller if the environmental brightness is less than or equal to the predetermined brightness such that the image sensor captures first image data having a YUV format;
   receiving the first image data having the YUV format from the image sensor;
   transforming the first image data having the YUV format into second image data having an NTSC format or a PAL format; and
   transferring the second image data to a display unit.

9. A detection method for a sensor system comprising an image sensor and an infrared cut filter above the image sensor, comprising:
   detecting environmental brightness and determining whether the environmental brightness is larger than a predetermined brightness or not, the infrared cut filter controlled to be closed by a controller if the environmental brightness is larger than the predetermined brightness such that the image sensor captures first image data having a YUV format;
   receiving the first image data having the YUV format from the image sensor;
   transforming the first image data having the YUV format into second image data having an NTSC format or a PAL format; and
   transferring the second image data to a display unit.

* * * * *